(12) United States Patent
Wang

(10) Patent No.: US 12,313,216 B2
(45) Date of Patent: May 27, 2025

(54) ELECTRONIC DEVICE STAND AND PROTECTIVE CASE WITH ELECTRONIC DEVICE STAND

(71) Applicant: Shenzhen Wanxinrong Mould Plastic Co., LTD, Shenzhen (CN)

(72) Inventor: Zili Wang, Shenzhen (CN)

(73) Assignee: Shenzhen Wanxinrong Mould Plastic Co., LTD, Shenzhen (CN)

( * ) Notice: Subject to any disclaimer, the term of this patent is extended or adjusted under 35 U.S.C. 154(b) by 64 days.

(21) Appl. No.: 18/503,354

(22) Filed: Nov. 7, 2023

(65) Prior Publication Data

US 2024/0068615 A1 Feb. 29, 2024

(30) Foreign Application Priority Data

Oct. 13, 2023 (CN) .......................... 202322780806.4

(51) Int. Cl.
*F16M 13/00* (2006.01)
*A45C 11/00* (2006.01)

(52) U.S. Cl.
CPC ........... *F16M 13/005* (2013.01); *A45C 11/00* (2013.01); *A45C 11/002* (2025.01); *A45C 11/003* (2025.01); *A45C 2200/15* (2013.01)

(58) Field of Classification Search
CPC ... F16M 13/0005; A45C 11/00; A45C 11/002; A45C 11/003
USPC ................................... 248/683, 206.5, 309.4
See application file for complete search history.

(56) References Cited

U.S. PATENT DOCUMENTS

| | | | |
|---|---|---|---|
| 10,591,480 B2 * | 3/2020 | Heinz | G01N 33/56983 |
| 10,784,914 B1 * | 9/2020 | Kim | H04M 1/185 |
| 11,658,694 B1 * | 5/2023 | Wang | H04B 1/3877 |
| | | | 455/575.8 |
| 11,710,988 B2 * | 7/2023 | Larsson | H02J 50/005 |
| | | | 320/108 |
| 11,892,876 B1 * | 2/2024 | Lynch | G06F 1/1632 |
| 12,031,669 B2 * | 7/2024 | Whitten | A45F 5/10 |
| 12,089,727 B2 * | 9/2024 | Liu | A45F 5/10 |
| 12,171,315 B2 * | 12/2024 | Lin | A45C 11/00 |
| 2011/0170244 A1 | 7/2011 | Son et al. | |
| 2016/0282905 A1 | 9/2016 | Laine et al. | |
| 2019/0313541 A1 | 10/2019 | Yamada et al. | |

* cited by examiner

*Primary Examiner* — Todd M Epps
(74) *Attorney, Agent, or Firm* — Hemisphere Law, PLLC; Zhigang Ma

(57) ABSTRACT

The present disclosure discloses an electronic device stand and a protective case with the electronic device stand, wherein the electronic device stand includes: a fixed base, wherein the fixed base is provided with a first mounting slot, and at least one limiting convex block is fixedly arranged on a slot wall of the first mounting slot; a rotatable base, wherein the rotatable base is arranged in the first mounting slot, and a sliding chute matched with the limiting convex block is formed in an outer side wall of the rotatable base; and a supporting member, wherein one side of the supporting member is rotatably connected to the rotatable base through a hinge, and the supporting member forms an angle with the rotatable base in a rotating process. The technical solutions of the present disclosure effectively improve the practicability of the electronic device stand.

20 Claims, 7 Drawing Sheets

ELECTRONIC DEVICE STAND AND PROTECTIVE CASE WITH ELECTRONIC DEVICE STAND

TECHNICAL FIELD

The present disclosure relates to the technical field of electronic device accessories, and in particular, to an electronic device stand and a protective case with an electronic device stand.

BACKGROUND

Electronic devices, such as smartphones, tablets, and laptops, have become an indispensable part of modern life. In order to provide a better user experience, these electronic devices usually require a stand, so that users can conveniently place the devices and adjust angles of the devices. These stands are designed to provide stability and adjustability, so as to adapt to various usage scenarios and needs.

A traditional electronic device stand usually includes a fixed base and a supporting member. The supporting member is usually connected to the fixed base through a hinge. Users can adjust an angle of the device by rotating the supporting member. However, the traditional stand may have some inconveniences in some cases. For example, a user needs to rotate the supporting member hardly to adjust an angle of the stand, which may not be flexible enough or may easily cause fatigue. In addition, some stands are possibly not stable enough during angle adjustment, causing the device to shake or become unstable.

Therefore, it is necessary to provide a new electronic device stand that can provide stability while making it easier for users to adjust an angle of a device, thereby improving the convenience and comfort of use.

SUMMARY

The present disclosure mainly aims to provide an electronic device stand, and aims at solving the technical problem of low practicability of the existing electronic device stand.

In order to achieve the above objective, the electronic device stand provided by the present disclosure includes:
  a fixed base, wherein the fixed base is provided with a first mounting slot, and at least one limiting convex block is fixedly arranged on a slot wall of the first mounting slot;
  a rotatable base, wherein the rotatable base is arranged in the first mounting slot, and a sliding chute matched with the limiting convex block is formed in an outer side wall of the rotatable base; and
  a supporting member, wherein one side of the supporting member is rotatably connected to the rotatable base through a hinge, and the supporting member forms an angle with the rotatable base in a rotating process.

Optionally, a quantity of the limiting convex blocks is multiple; and the plurality of limiting convex blocks are arranged at intervals along the slot wall of the first mounting slot.

Optionally, one end of the sliding chute extends along the outer side wall of the rotatable base and is communicated to the other end of the sliding chute.

Optionally, a first storage slot configured to store the supporting member is formed in one side of the rotatable base facing the supporting member.

Optionally, the electronic device stand further includes a fixing component; the fixing component includes a magnetism enhancement iron sheet and a magnet matched with the magnetism enhancement iron sheet; the magnetism enhancement iron sheet is fixed on a bottom wall of the first storage slot; and the magnet is arranged on one surface of the supporting member facing the rotatable base.

Optionally, a first fixing slot is formed in the bottom wall of the first storage slot; the magnetism enhancement iron sheet is fixedly arranged in the first fixing slot; the supporting member is provided with a second fixing slot; and the magnet is fixedly arranged in the second fixing slot.

Optionally, there are a plurality of magnets arranged at intervals in the second fixing slot.

Optionally, the electronic device stand further includes a friction plate; a third fixing slot is arranged on one surface of the rotatable base facing the fixed base; and the friction plate is arranged in the third fixing slot.

Optionally, the fixed base is annular; and a shape of the rotatable base and a shape of the supporting member adapt to the shape of the fixed base.

Optionally, a movable gap is formed in one side of the supporting member.

Optionally, a second storage slot is formed in one side of the rotatable base, and the hinge is mounted in the second storage slot.

Optionally, the hinge includes a first hinge and a second hinge hinged to the first hinge; the first hinge is fixed to the rotatable base; the second hinge is fixed to the supporting member; and a limiting plate is arranged on one side of the first hinge.

The present disclosure further provides a protective case with an electronic device stand, including:
  a fixed base, wherein the fixed base is provided with a first mounting slot, and at least one limiting convex block is fixedly arranged on a slot wall of the first mounting slot;
  a rotatable base, wherein the rotatable base is arranged in the first mounting slot, and a sliding chute matched with the limiting convex block is formed in an outer side wall of the rotatable base;
  a supporting member, wherein one side of the supporting member is rotatably connected to the rotatable base through a hinge, and the supporting member forms an angle with the rotatable base in a rotating process; and
  a case body, wherein the fixed base is adhered to one side of the case body.

Optionally, the case body is provided with a second mounting slot matched with the fixed base; and the fixed base is fixedly arranged in the second mounting slot.

Optionally, one end of the sliding chute extends along the outer side wall of the rotatable base and is communicated to the other end of the sliding chute.

Optionally, a first storage slot configured to store the supporting member is formed in one side of the rotatable base facing the supporting member.

Optionally, the protective case with the electronic device stand further includes a fixing component; the fixing component includes a magnetism enhancement iron sheet and a magnet matched with the magnetism enhancement iron sheet; the magnetism enhancement iron sheet is fixed on a bottom wall of the first storage slot; and the magnet is arranged on one surface of the supporting member facing the rotatable base.

Optionally, a first fixing slot is formed in the bottom wall of the first storage slot; the magnetism enhancement iron sheet is fixedly arranged in the first fixing slot; the supporting member is provided with a second fixing slot; and the magnet is fixedly arranged in the second fixing slot.

Optionally, one side of the rotatable base is provided with a second storage slot, and the hinge is mounted in the second storage slot.

Optionally, the hinge includes a first hinge and a second hinge hinged to the first hinge; the first hinge is fixed to the rotatable base; the second hinge is fixed to the supporting member; and a limiting plate is arranged on one side of the first hinge.

According to the technical solutions of the present disclosure, the rotatable base is mounted in the first fixing slot of the fixed base; the supporting member is rotatably connected to the rotatable base through the hinge; and the supporting member forms an angle with the rotatable base in the rotating process to play a supporting role. At least one limiting convex block is arranged on the slot wall of the first mounting slot to restrict the rotatable base from moving up and down to be separated from the fixed base. At the same time, the sliding chute matched with the limiting convex block is formed in the outer side wall of the rotatable base. Specifically, the rotatable base is mounted in the first mounting slot through an opening of the first mounting slot, and the limiting convex block is partially located in the sliding chute, thereby effectively restricting the rotatable base from moving up and down. Due to the movable connection between the rotatable base and the fixed base through the limiting convex block and the sliding chute, the stand can support an electronic device in multiple angles, thereby effectively improving the practicality of the electronic device stand.

BRIEF DESCRIPTION OF THE DRAWINGS

To describe the technical solutions in the embodiments of the present disclosure or in the prior art more clearly, the following briefly introduces the accompanying drawings for describing the embodiments or the related art. Apparently, the accompanying drawings in the following description show merely some embodiments of the present disclosure, and a person of ordinary skill in the art may still derive other drawings according to structures shown in these accompanying drawings without creative efforts.

Figure 1:
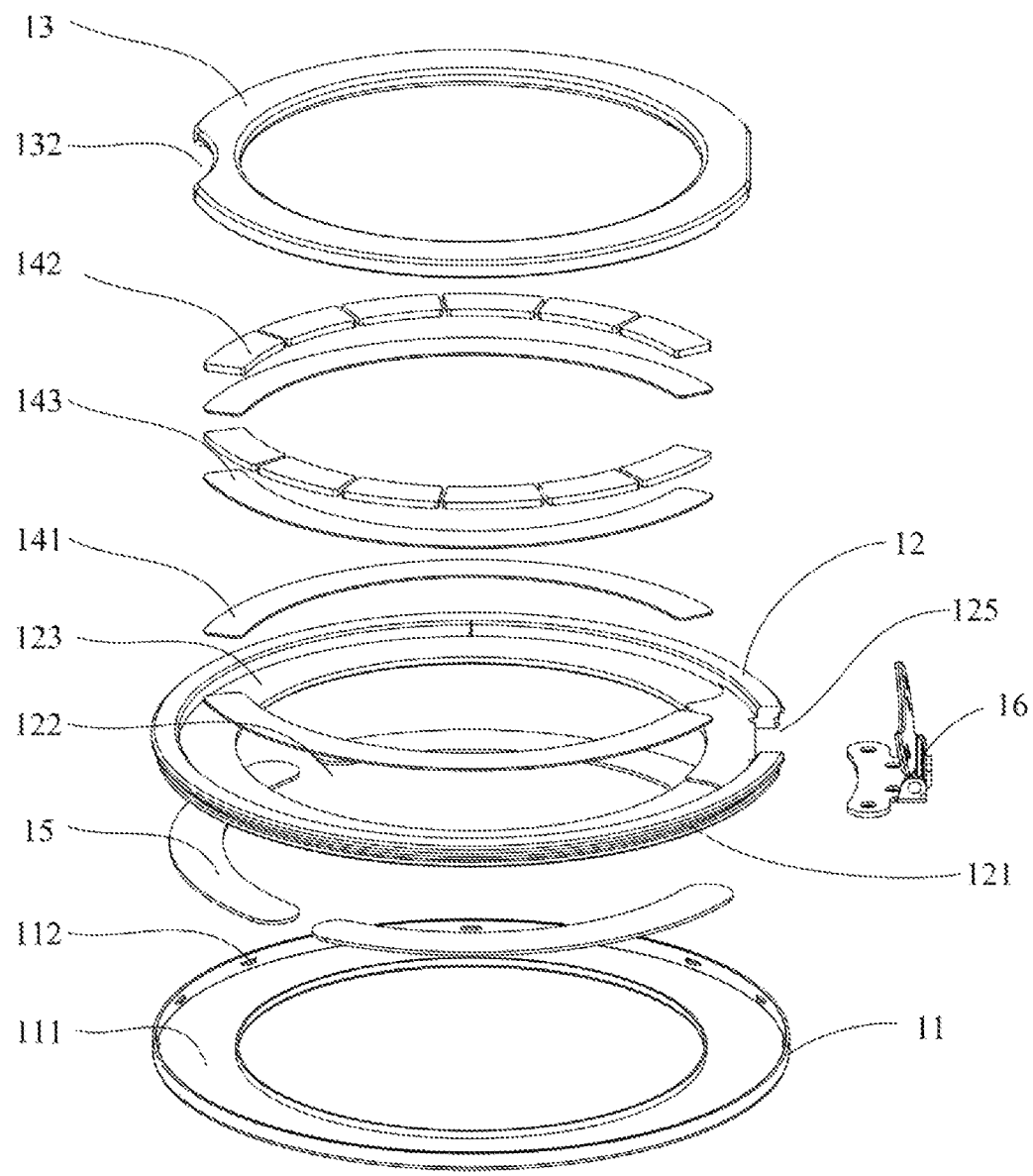
FIG. 1 is a schematic structural diagram of an exploded state of an electronic device stand in one angle according to the present disclosure.

| Numeral | Name | Numeral | Name |
|---|---|---|---|
| 10 | Electronic device stand | 13 | Supporting member |
| 11 | Fixed base | 131 | Second fixing slot |
| 111 | First mounting slot | 132 | Movable gap |
| 112 | Limiting convex block | 141 | Magnetism enhancement iron sheet |
| 12 | Rotatable base | 142 | Magnet |
| 121 | Sliding chute | 143 | Decorative sheet |
| 122 | First storage slot | 15 | Friction plate |
| 123 | First fixing slot | 16 | Hinge |
| 124 | Third fixing slot | 161 | First hinge |
| 125 | Second storage slot | 162 | Limiting plate |
| 17 | Case body | 163 | Second hinge |
| 171 | Second mounting slot | Electronic device | 20 |

The implementations, functional features, and advantages of the present disclosure will be further explained in conjunction with the embodiments and with reference to the accompanying drawings.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

It should be noted that if there are directional indications (such as up, down, left, right, front, back . . . ) involved in the embodiments of the present disclosure, the directional indications are only used to explain the relative positional relationship, motion states, and the like between various components in specific postures (as shown in the accompanying drawings). If the specific postures change, the directional indications also change correspondingly.

In addition, if there are descriptions related to "first", "second", and the like in the embodiments of the present disclosure, the descriptions of "first", "second", and the like are only used for descriptive purposes and cannot be understood as indicating or implying their relative importance or implying the quantities of indicated technical features. From this, features defined as "first" and "second" may explicitly or implicitly include at least one feature. In addition, if "and/or" herein means including three parallel schemes, "A and/or B" is taken as an example, which includes scheme A, scheme B, or a scheme that is satisfied by both A and B. In addition, the technical solutions between the various embodiments can be combined with each other, but need to be implemented by those of ordinary skill in the art. When there is a conflict in a combination of technical solutions or the combination cannot be achieved, it should be considered that the combination of the technical solutions does not exist and does not fall within the protection scope of the present disclosure.

The present disclosure provides an electronic device stand 10.

In the embodiments of the present disclosure, as shown in FIG. 1 to FIG. 5, the electronic device stand 10 includes:

a fixed base 11, wherein the fixed base 11 is provided with a first mounting slot 111, and at least one limiting convex block 112 is fixedly arranged on a slot wall of the first mounting slot 111;

a rotatable base 12, wherein the rotatable base 12 is arranged in the first mounting slot 111, and a sliding chute 121 matched with the limiting convex block 112 is formed in an outer side wall of the rotatable base 12; and a supporting member 13, wherein one side of the supporting member 13 is rotatably connected to the rotatable base 12 through a hinge 16, and the supporting member 13 forms an angle with the rotatable base 12 in a rotating process.

In this embodiment, the fixed base 11 is a basic part of the stand, which mainly serves as a component connecting the stand to an electronic device and is configured to provide mounting positions for other components of the stand. Specifically, the fixed base 11 is provided with a first mounting slot 111 in a vertical direction. A limiting convex block 112 is arranged on a slot wall of the first mounting slot 111. The limiting convex block 112 is configured to restrict the rotatable base 12 from moving up and down in the vertical direction of the fixed base 11.

The rotatable base 12 is a rotatable part of the stand, which can rotate in the first mounting slot 111. A sliding chute 121 matched with the limiting convex block 112 is formed in an outer side wall of the rotatable base 12. The sliding chute 121 allows the rotatable base 12 to rotate in the first mounting slot 111, while the rotatable base is controlled by the limiting convex block 112 to ensure that the rotatable base 12 moves in a specific angle range.

The supporting member 13 is an upper structure of the stand and is configured to be in contact with a carrying surface to support an electronic device. One side of the supporting member 13 is rotatably connected to the rotatable base 12 through a hinge 16. This rotatable connection enables the supporting member 13 to rotate around the fixed base 11. In the rotating process, the supporting member 13 forms an angle with the rotatable base 12, so as to allow the supporting member 13 to support the electronic device in different angles.

In addition, the fixed base 11, the rotatable base 12, and the supporting member 13 are all annular, and a movable gap 132 for a user to pull the supporting member 13 to rotate with a finger is formed in one side of the supporting member 13.

According to the technical solutions of the present disclosure, the rotatable base 12 is mounted in a first fixing slot 123 of the fixed base 11; the supporting member 13 is rotatably connected to the rotatable base 12 through the hinge 16; and the supporting member 13 forms an angle with the rotatable base 12 in the rotating process to play a supporting role. At least one limiting convex block 112 is arranged on the slot wall of the first mounting slot 111 to restrict the rotatable base 12 from moving up and down to be separated from the fixed base 11. At the same time, the sliding chute 121 matched with the limiting convex block 112 is formed in the outer side wall of the rotatable base 12. Specifically, the rotatable base 12 is mounted in the first mounting slot 111 through an opening of the first mounting slot 111, and the limiting convex block 112 is partially located in the sliding chute 121, thereby effectively restricting the rotatable base 12 from moving up and down. Due to the movable connection between the rotatable base 12 and the fixed base 11 through the limiting convex block 112 and the sliding chute 121, the stand can support an electronic device 20 in multiple angles, thereby effectively improving the practicality of the electronic device stand 10.

Further, as shown in FIG. 2 to FIG. 5, a quantity of the limiting convex blocks 112 is multiple; and the plurality of limiting convex blocks 112 are arranged at intervals along the slot wall of the first mounting slot 111. In this embodiment, the quantity of limiting convex blocks 112 of the electronic device stand 10 is multiple, which can provide more limiting points for the rotatable base 12 to prevent the rotatable base 12 from being separated from the fixed base 11 in the rotating process, thus effectively improving the structural stability of the stand.

Further, as shown in FIG. 1, FIG. 2, FIG. 4, and FIG. 5, one end of the sliding chute 121 extends along the outer side wall of the rotatable base 12 and is communicated to the other end of the sliding chute 121. In this embodiment, one end of the sliding chute 121 extends along the outer side wall of the rotatable base 12 and is communicated to the other end of the sliding chute 121. It can be understood that the sliding chute 121 is annular, so that the rotatable base 12 can rotate 360 degrees around its central axis, thereby making the stand adapting to more usage scenarios and effectively improving the practicality of the stand.

Further, as shown in FIG. 1, a first storage slot 122 configured to store the supporting member 13 is formed in one side of the rotatable base 12 facing the supporting member 13. In this embodiment, the rotatable base 12 of the electronic device stand 10 is provided with the first storage slot 122 for safe storage of the supporting member 13. It can be understood that when the supporting member 13 is not used, the supporting member 13 can be rotated and stored in the first storage slot 122 of the rotatable base 12, thus effectively saving a space occupied by the stand and improving the practicality of the electronic device stand 10.

Figure 2:
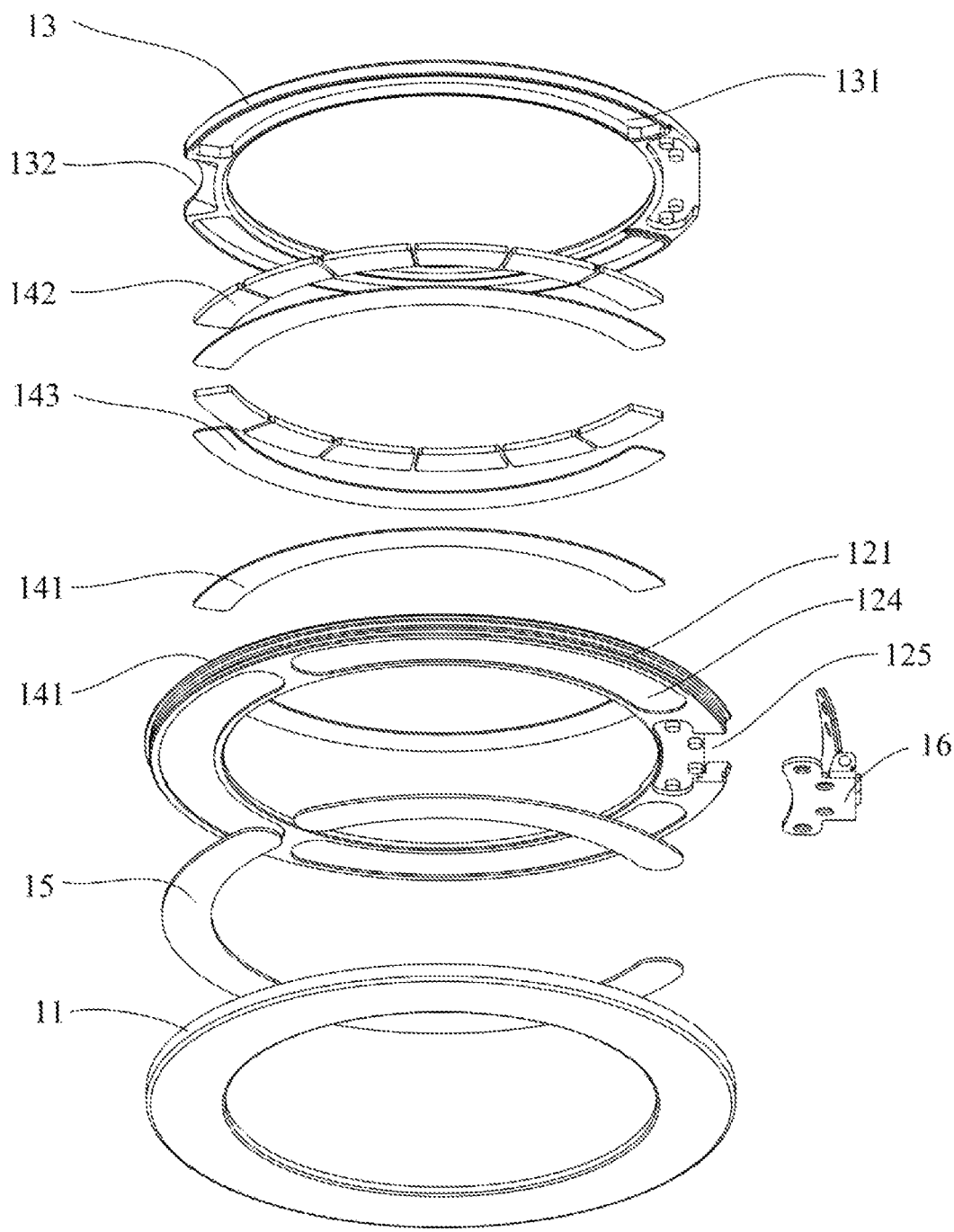
FIG. 2 is a schematic structural diagram of an exploded state of an electronic device stand in another angle according to the present disclosure.

Further, as shown in FIG. 1 and FIG. 2, the electronic device stand 10 further includes a fixing component; the fixing component includes a magnetism enhancement iron sheet 141 and a magnet 142 matched with the magnetism enhancement iron sheet 141; the magnetism enhancement iron sheet 141 is fixed on a bottom wall of the first storage slot 122; and the magnet 142 is arranged on one surface of the supporting member 13 facing the rotatable base 12. In this embodiment, the fixing component of the electronic device stand 10 includes the magnetism enhancement iron sheet 141 and the magnet 142 matched with the magnetism enhancement iron sheet 141, to help the supporting member 13 be stably stored in the storage slot of the rotatable base 12. Mounting positions of the magnetism enhancement iron sheet 141 and the magnet 142 can be interchanged. Details will not be limited here.

In addition, a decorative sheet 143 is also arranged between the magnetism enhancement iron sheet 141 and the magnet 142. The decorative sheet 143 is adhered on the magnet 142 to prevent collision between the magnet 142 and the magnetism enhancement iron sheet 141 from affecting the structural stability. This also has a certain sound attenuation effect.

Further, as shown in FIG. 1 and FIG. 2, a first fixing slot 123 is formed in the bottom wall of the first storage slot 122; the magnetism enhancement iron sheet 141 is fixedly arranged in the first fixing slot 123; the supporting member 13 is provided with a second fixing slot 131; and the magnet 142 is fixedly arranged in the second fixing slot 131. In this embodiment, the first fixing slot 123 is formed in on the bottom wall of the first storage slot 122 of the electronic device stand 10, and the second fixing slot 131 is formed in the supporting member 13, so that the magnetism enhancement iron sheet 141 and the magnet 142 can be more firmly fixed, which effectively prevents the magnetism enhancement iron sheet 141 and the magnet 142 from moving during use to affect the structural stability of the stand. Therefore, the stability and reliability of the stand are improved, ensuring that the electronic device is safely supported.

Further, as shown in FIG. 1 and FIG. 2, there are a plurality of magnets 142. The plurality of magnets 142 are arranged at intervals in the second fixing slot 131. In this embodiment, the plurality of magnets 142 are arranged at intervals in the second fixing slot 131 of the supporting member 13, the stability of abutment between the supporting member 13 and the rotatable base 12 can be improved. Further, a magnetic attraction force generated by the plurality of magnets 142 is distributed more uniformly, which can more effectively maintain the position stability of the supporting member 13 and prevent the supporting member from being accidentally loosened or moving. This improves the reliability of the stand.

Further, as shown in FIG. 1 and FIG. 2, the electronic device stand 10 further includes a friction plate 15; a third fixing slot 124 is arranged on one surface of the rotatable base 12 facing the fixed base 11; and the friction plate 15 is arranged in the third fixing slot 124. In this embodiment, the existence of the friction plate 15 contributes to adjusting a rotating resistance of the rotatable base 12. Since the friction plates 15 is placed in the third fixing slot 124, a user can increase or decrease the friction to the rotatable base 12 as needed, thereby adjusting the smoothness of the rotating operation of the stand and making the stand used more flexibly and easily.

Further, as shown in FIG. 1, FIG. 2, FIG. 4, and FIG. 5, a second storage slot 125 is formed in one side of the rotatable base 12, and the hinge 16 is mounted in the second storage slot 125. In this embodiment, the second storage slot 125 is formed in one side of the rotatable base 12, so that the hinge 16 can be mounted in a narrow space. This design makes the stand more compact and suitable for an application scenario with a limited space. At the same time, the hinge 16 is mounted in the second storage slot 125, so that the hinge will not protrude or occupy an additional space, which further improves the space utilization efficiency of the stand. The overall design of the stand is more compact, and the stand is more convenient to mount.

Figure 3:
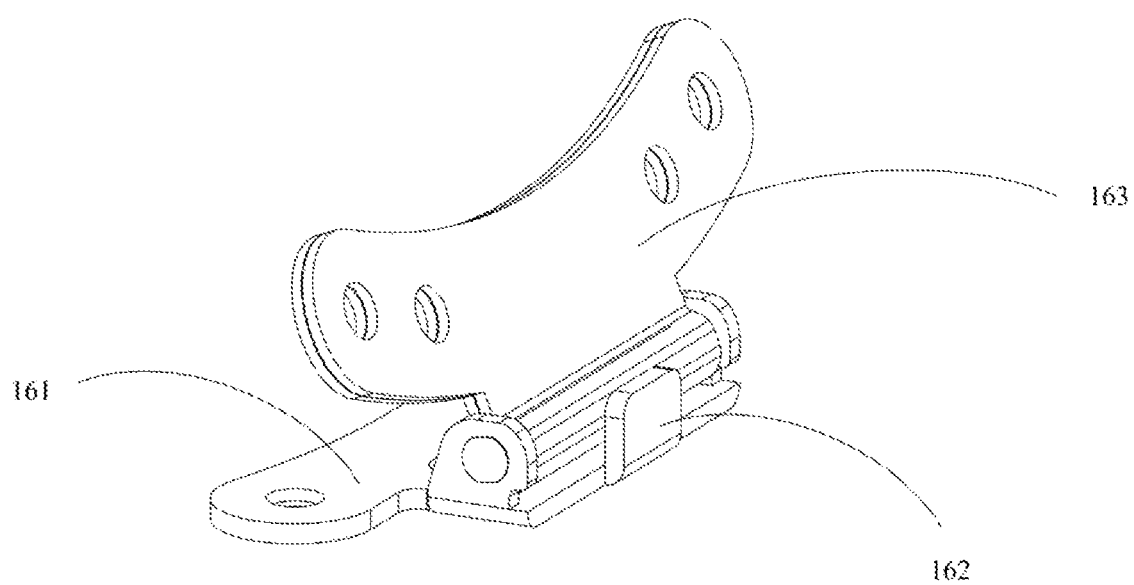
FIG. 3 is a schematic structural diagram of a hinge.
Figure 4:
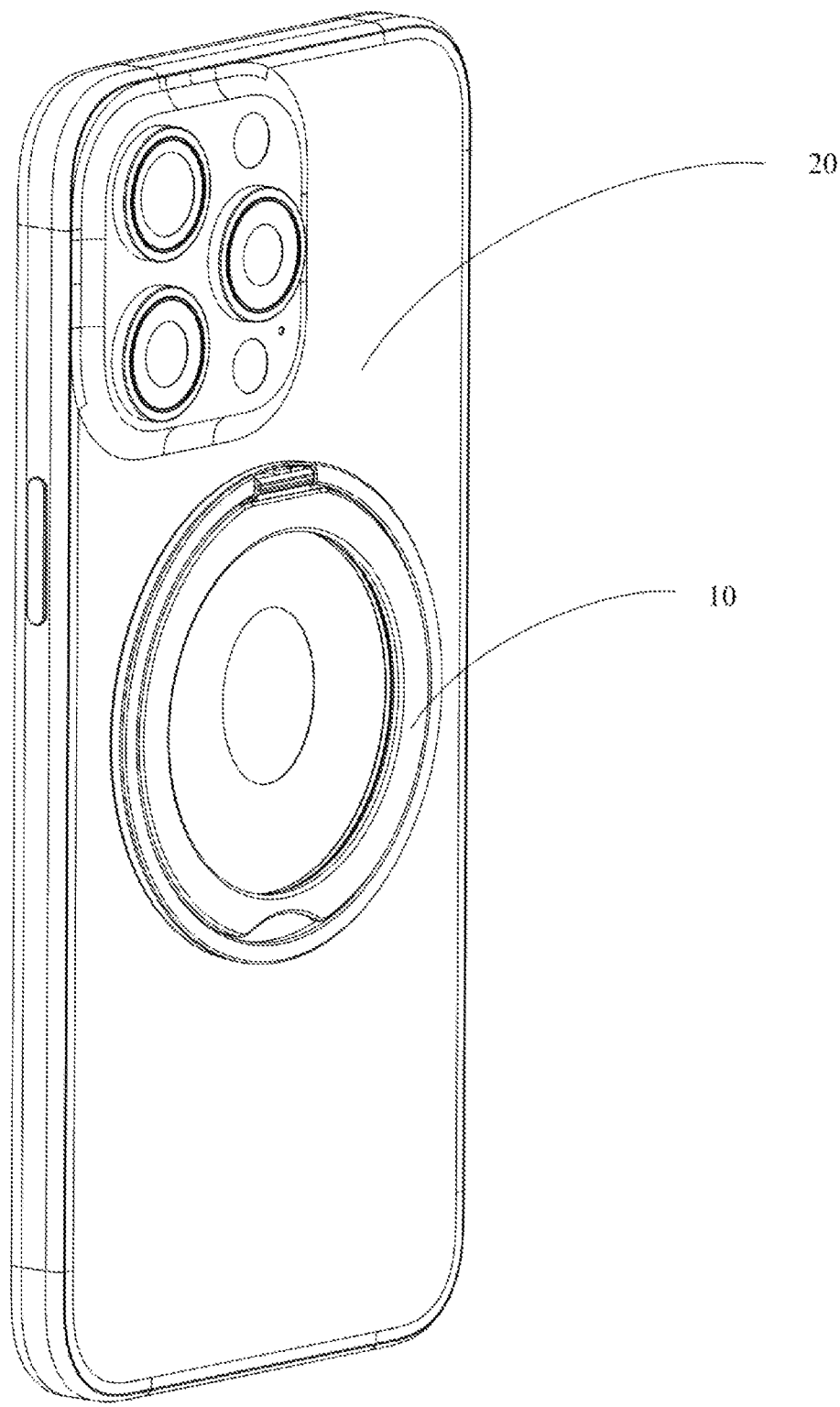
FIG. 4 is a schematic structural diagram of one embodiment of an electronic device stand according to the present disclosure.
Figure 5:
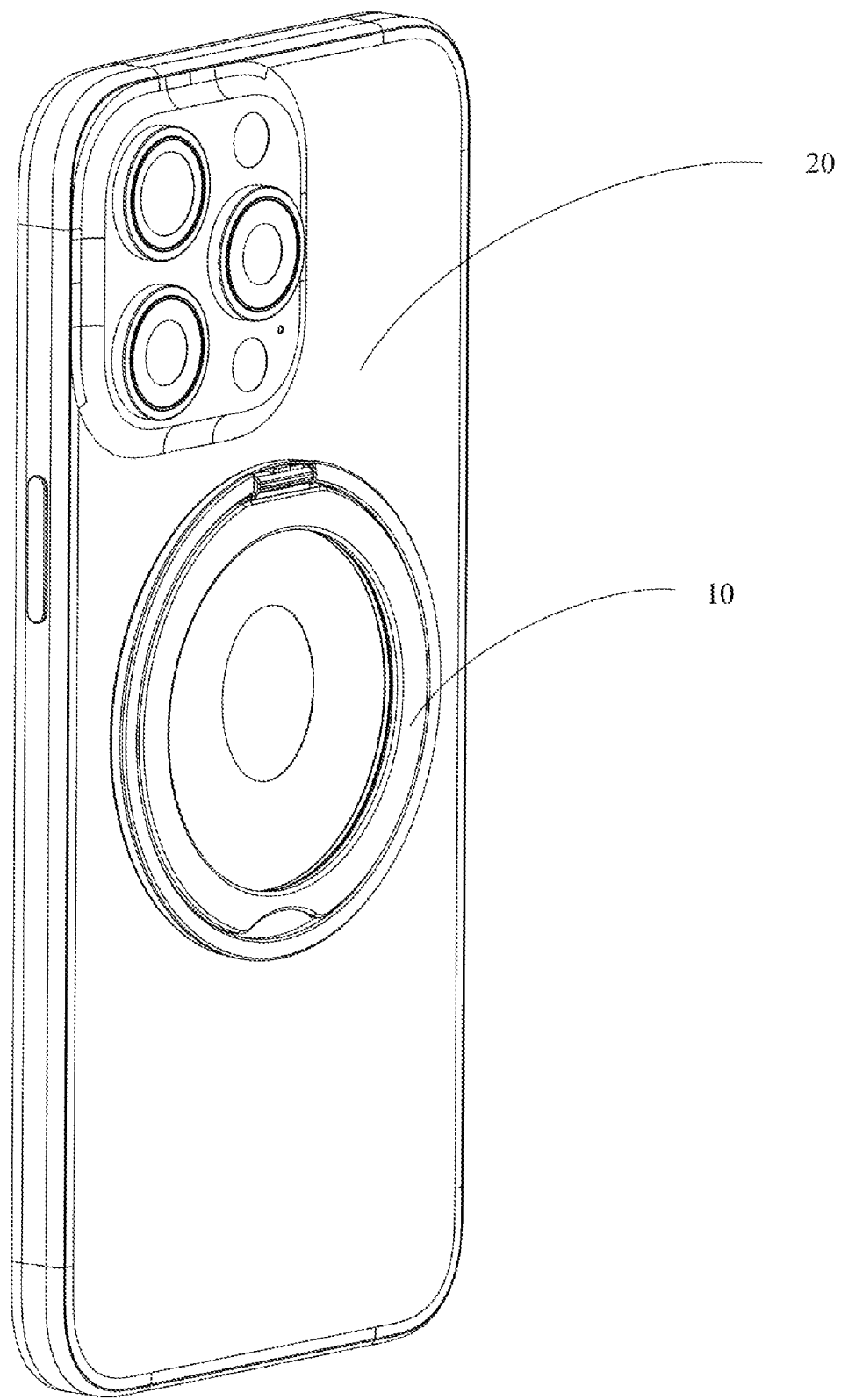
FIG. 5 is a schematic structural diagram of another embodiment of an electronic device stand according to the present disclosure.

Further, as shown in FIG. 1, FIG. 2, and FIG. 3, the hinge 16 includes a first hinge 161 and a second hinge 163 hinged to the first hinge 161; the first hinge 161 is fixed to the rotatable base 12; the second hinge 163 is fixed to the supporting member 13; and a limiting plate 162 is arranged on one side of the first hinge 161. In this embodiment, using the two hinges (the first hinge 161 and the second hinge 163) and the limiting plate 162 can more flexibly control the stand to rotate. The first hinge 161 is fixed to the rotatable base 12, and the second hinge 163 is fixed to the supporting member 13. The two hinges allow the stand to rotate in different directions. Meanwhile, the limiting plate 162 can limit a rotating range of the hinge 16, thus ensuring that the stand rotates within a desired angle range, which improves the controllability and applicability of the stand.

In addition, the rotatable base 12 and the supporting member 13 are provided with the fixing slots, configured to fix the hinge 16, on a circumferential side of the second storage slot 125. The first hinge 161 and the second hinge 163 are respectively fixed in the fixing slots to effectively improve the space utilization efficiency of the stand.

The present disclosure further provides a protective case with an electronic device stand 10. The protective case includes a case body 17 and the electronic device stand 10. A specific structure of the electronic device stand 10 refers to the above embodiments. Since the protective case with the electronic device stand 10 adopts all the technical solutions of all the above embodiments, the protective case at least has all the beneficial effects brought by the technical solutions of the above embodiments. Details will be omitted here. The electronic device stand 10 is adhered to one side of the case body 17. The electronic device stand 10 is combined with the protective case, so that a user can conveniently carry and use an electronic device 20, and the device can also be protected from being damaged or collided.

Figure 6:
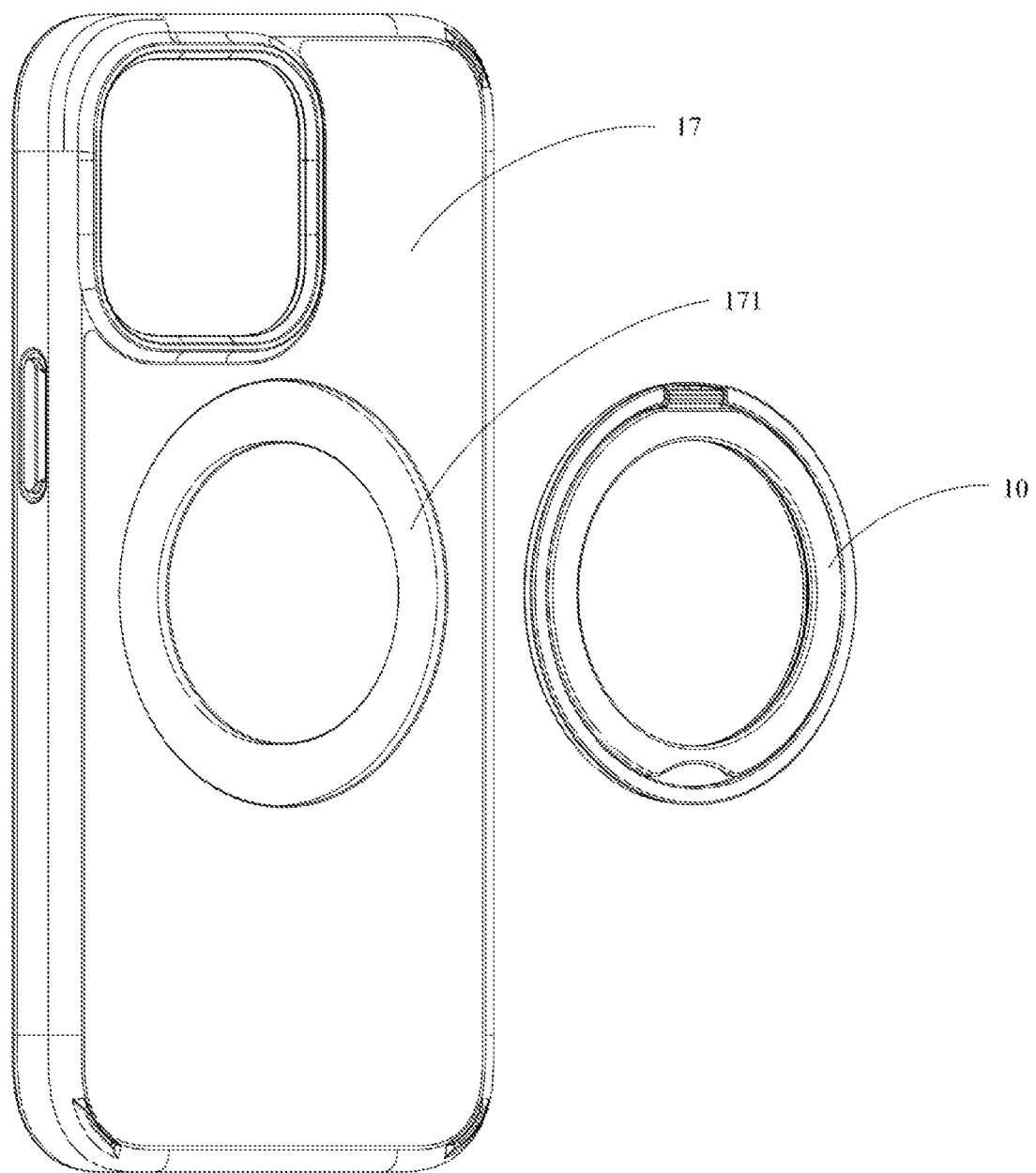
FIG. 6 is a schematic structural diagram of an exploded state of one embodiment of a protective case with an electronic device stand according to the present disclosure.
Figure 7:
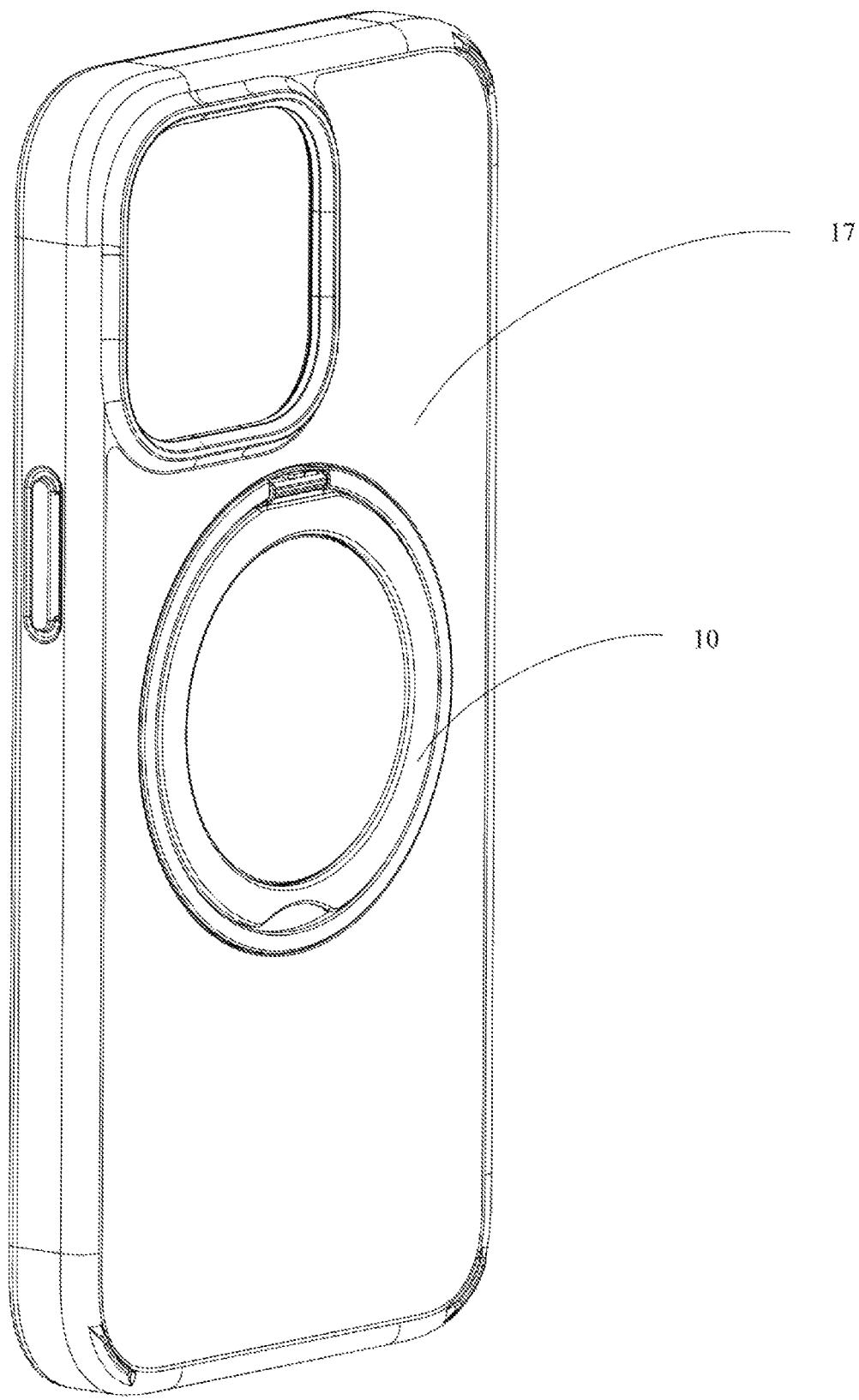
FIG. 7 is a schematic structural diagram of one embodiment of a protective case with an electronic device stand according to the present disclosure.

Further, as shown in FIG. 6 and FIG. 7, the case body 17 is provided with a second mounting slot 171 matched with the electronic device stand 10, and the electronic device stand 10 is fixedly arranged in the second mounting slot 171. In this embodiment, the electronic device stand 10 is firmly fixed in the second mounting slot 171 of the case body 17, so that a stable connection between the stand 10 and the protective case can be ensured. This design tightly integrates the stand 10 with the protective case, so that they are difficult to fall off or move, thereby effectively protecting the electronic device from being damaged or collided. The user can easily carry the electronic device and the protective case without worrying about the safety of the stand 10. This provides two advantages of portability and protectiveness.

The above describes only optional embodiments of the present disclosure and does not limit the patent scope of the present disclosure. Any equivalent structural transformations made using the specification and accompanying drawings of the present disclosure within the inventive concept of the present disclosure, or directly or indirectly applied in other related technical fields, all fall within the scope of patent protection of the present disclosure.

What is claimed is:

1. An electronic device stand, comprising:
    a fixed base, wherein the fixed base is provided with a first mounting slot, and at least one limiting convex block is fixedly arranged on a slot wall of the first mounting slot;
    a rotatable base, wherein the rotatable base is arranged in the first mounting slot, and a sliding chute matched with the limiting convex block is formed in an outer side wall of the rotatable base; and
    a supporting member, wherein one side of the supporting member is rotatably connected to the rotatable base through a hinge, and the supporting member forms an angle with the rotatable base in a rotating process.

2. The electronic device stand according to claim 1, wherein a quantity of the limiting convex blocks is multiple; and the plurality of limiting convex blocks are arranged at intervals along the slot wall of the first mounting slot.

3. The electronic device stand according to claim 2, wherein one end of the sliding chute extends along the outer side wall of the rotatable base and is communicated to the other end of the sliding chute.

4. The electronic device stand according to claim 1, wherein a first storage slot configured to store the supporting member is formed in one side of the rotatable base facing the supporting member.

5. The electronic device stand according to claim 4, wherein the electronic device stand further comprises a fixing component; the fixing component comprises a magnetism enhancement iron sheet and a magnet matched with the magnetism enhancement iron sheet; the magnetism enhancement iron sheet is fixed on a bottom wall of the first storage slot; and the magnet is arranged on one surface of the supporting member facing the rotatable base.

6. The electronic device stand according to claim 5, wherein a first fixing slot is formed in the bottom wall of the first storage slot; the magnetism enhancement iron sheet is fixedly arranged in the first fixing slot; the supporting member is provided with a second fixing slot; and the magnet is fixedly arranged in the second fixing slot.

7. The electronic device stand according to claim 6, wherein there are a plurality of magnets arranged at intervals in the second fixing slot.

8. The electronic device stand according to claim 1, wherein the electronic device stand further comprises a friction plate; a third fixing slot is arranged on one surface of the rotatable base facing the fixed base; and the friction plate is arranged in the third fixing slot.

9. The electronic device stand according to claim 1, wherein the fixed base is annular; and a shape of the rotatable base and a shape of the supporting member adapt to the shape of the fixed base.

10. The electronic device stand according to claim 1, wherein a movable gap is formed in one side of the supporting member.

11. The electronic device stand according to claim 1, wherein a second storage slot is formed in one side of the rotatable base, and the hinge is mounted in the second storage slot.

12. The electronic device stand according to claim 11, wherein the hinge comprises a first hinge and a second hinge hinged to the first hinge; the first hinge is fixed to the rotatable base; the second hinge is fixed to the supporting member; and a limiting plate is arranged on one side of the first hinge.

13. A protective case with an electronic device stand, comprising:
  a fixed base, wherein the fixed base is provided with a first mounting slot, and at least one limiting convex block is fixedly arranged on a slot wall of the first mounting slot;
  a rotatable base, wherein the rotatable base is arranged in the first mounting slot, and a sliding chute matched with the limiting convex block is formed in an outer side wall of the rotatable base;
  a supporting member, wherein one side of the supporting member is rotatably connected to the rotatable base through a hinge, and the supporting member forms an angle with the rotatable base in a rotating process; and
  a case body, wherein the fixed base is adhered to one side of the case body.

14. The protective case with the electronic device stand according to claim 13, wherein the case body is provided with a second mounting slot matched with the fixed base; and the fixed base is fixedly arranged in the second mounting slot.

15. The protective case with the electronic device stand according to claim 13, wherein one end of the sliding chute extends along the outer side wall of the rotatable base and is communicated to the other end of the sliding chute.

16. The protective case with the electronic device stand according to claim 13, wherein a first storage slot configured to store the supporting member is formed in one side of the rotatable base facing the supporting member.

17. The protective case with the electronic device stand according to claim 13, wherein the protective case with the electronic device stand further comprises a fixing component; the fixing component comprises a magnetism enhancement iron sheet and a magnet matched with the magnetism enhancement iron sheet; the magnetism enhancement iron sheet is fixed on a bottom wall of the first storage slot; and the magnet is arranged on one surface of the supporting member facing the rotatable base.

18. The protective case with the electronic device stand according to claim 17, wherein a first fixing slot is formed in the bottom wall of the first storage slot; the magnetism enhancement iron sheet is fixed in the first fixing slot; the supporting member is provided with a second fixing slot; and the magnet is fixed in the second fixing slot.

19. The protective case with the electronic device stand according to claim 13, wherein a second storage slot is formed in one side of the rotatable base, and the hinge is mounted in the second storage slot.

20. The protective case with the electronic device stand according to claim 19, wherein the hinge comprises a first hinge and a second hinge hinged to the first hinge; the first hinge is fixed to the rotatable base; the second hinge is fixed to the supporting member; and a limiting plate is arranged on one side of the first hinge.

* * * * *